(12) United States Patent
Schreiner

(10) Patent No.: US 7,946,963 B1
(45) Date of Patent: May 24, 2011

(54) EXERCISE CYCLE

(76) Inventor: Josef Schreiner, Los Angeles, CA (US)

( * ) Notice: Subject to any disclaimer, the term of this patent is extended or adjusted under 35 U.S.C. 154(b) by 85 days.

(21) Appl. No.: 12/370,008

(22) Filed: Feb. 12, 2009

Related U.S. Application Data

(60) Provisional application No. 60/027,848, filed on Feb. 12, 2008.

(51) Int. Cl.
*A63B 22/06* (2006.01)
*A63B 69/16* (2006.01)
*A63B 69/06* (2006.01)
*B62M 1/10* (2010.01)
*B62M 1/00* (2010.01)

(52) U.S. Cl. .............. 482/57; 482/62; 482/72; 280/217; 280/223; 280/226.1

(58) Field of Classification Search .................... 482/57, 482/61, 62, 72; 280/217, 223, 226.1, 234, 280/267, 282, 210, 211
See application file for complete search history.

(56) References Cited

U.S. PATENT DOCUMENTS

| | | | |
|---|---|---|---|
| 4,632,414 A * | 12/1986 | Ellefson ........................ 280/246 |
| 4,639,007 A * | 1/1987 | Lawrence ..................... 280/234 |
| 4,705,284 A | 11/1987 | Stout | |
| 4,796,907 A * | 1/1989 | Geller ........................... 280/220 |
| 4,886,287 A * | 12/1989 | Krause et al. ................. 280/246 |
| 4,941,673 A * | 7/1990 | Bennett ...................... 280/242.1 |
| 5,280,936 A | 1/1994 | Schmidlin | |
| 5,536,029 A | 7/1996 | Gramckow | |
| 6,206,394 B1 * | 3/2001 | Olson et al. ................... 280/244 |
| 6,352,274 B1 | 3/2002 | Redman | |
| 6,572,129 B1 * | 6/2003 | Bean ............................ 280/234 |
| 7,237,786 B2 | 7/2007 | Montez | |
| 7,654,545 B1 * | 2/2010 | Millirans ...................... 280/223 |

\* cited by examiner

*Primary Examiner* — Allana Lewin
(74) *Attorney, Agent, or Firm* — Kenneth L. Tolar

(57) ABSTRACT

An exercise cycle includes a base frame having front and rear wheels and a seat slidably mounted thereon. A pair of pivotal foot pedals operate a steering mechanism to turn the front wheels toward the left or right. Between the foot pedals is a vertical support bar having a drive pawl at an upper end with a cable spirally wrapped thereabout. A handle affixed to the distal end of the cable is accessible by a rider resting in the seat. A drive chain encompasses a gear on a side of the pawl and a similar gear on the rear wheel axle. Accordingly, a rider sits on the seat, grasps the handle and places the feet on the foot pedals. By pushing with the legs and simultaneously pulling the cable, the rider propels the cycle while simulating the workout typically provided by a rowing machine.

12 Claims, 3 Drawing Sheets

EXERCISE CYCLE

CROSS REFERENCE TO RELATED APPLICATIONS

This application is entitled to the benefit of provisional application No. 61/027,848 filed on Feb. 12, 2008, the specification of which is incorporated herein by reference.

BACKGROUND OF THE INVENTION

The present invention relates to a uniquely-designed cycle that simultaneously exerts the rider's leg, arm and torso muscles.

DESCRIPTION OF THE PRIOR ART

Rowing machines are widely used as a means of simultaneously exerting muscles in the legs, arms and torso. However, because the machines are stationary, they do not allow a user to enjoy the outdoors or to travel while exercising. Accordingly, there is currently a need for an exercise device that overcomes the aforementioned disadvantages of conventional rowing machines.

A review of the prior art reveals a myriad of rowing cycles that purportedly address the above-described problems associated with conventional rowing machines. For example, U.S. Pat. No. 7,237,786 issued to Montez discloses a rowing cycle including a steering unit formed of a vertical post with a horizontal handlebar at a top end thereof. The cycle is propelled by reciprocating the steering unit and is steered by laterally moving the steering unit.

U.S. Pat. No. 5,280,936 issued to Schmidlin discloses a bicycle having a drive mechanism formed of two parallel levers with a handlebar mounted on their upper ends. The bicycle is steered with the handlebar and is propelled by pulling the handlebar and simultaneously pushing a pair of footrests.

U.S. Pat. No. 4,705,284 issued to Stout discloses a cycle that is propelled with a reciprocal lever having a steering handle thereon.

U.S. Pat. No. 6,352,274 issued to Redman discloses a cycle that is that is driven by reciprocal levers and is steered by a swiveling seat when the operator leans to either side.

U.S. Pat. No. 5,536,029 issued to Gramckow discloses a rowing-powered cycle including a pair of motive arms that drive the cycle in response to fore-aft motion. The arms are connected to a linkage that steers the cycle in response to tilting the arms.

As indicated above, several prior art cycles, such as those disclosed in Montez, Scmidlin and Gramckow, are propelled by a rowing mechanism. However, each of the above-described prior art devices is steered by tilting or rotating the handlebars, which are also reciprocated to propel the cycle. Simultaneously reciprocating and steering handlebars are cumbersome and awkward tasks. Furthermore, imparting motion by reciprocating handlebars or levers requires a complicated gearing mechanism that is expensive to construct and difficult to manufacture. Finally, none of the above-mentioned devices include an alternative motive means that allow the user to propel the cycle with only the feet, if desired. Conversely, the present invention includes a foot-actuated steering mechanism, a handle/cable assembly for propelling the cycle, as opposed to handlebars or levers, and seat hooks for securing the handle if the operator wishes to only use the leg muscles to propel the cycle.

SUMMARY OF THE INVENTION

The present invention relates to an exercise cycle including a base frame having front and rear wheels and a seat slidably mounted thereon. A pair of pivotal foot pedals operate a steering mechanism to turn the front wheels toward the left or right. Between the foot pedals is a vertical support bar having a drive pawl at an upper end with a cable spirally wrapped thereabout. A handle affixed to the distal end of the cable is accessible by a rider resting in the seat. A drive chain encompasses a gear on a side of the pawl and a similar gear on the rear wheel axle. Accordingly, a rider sits on the seat, grasps the handle and places the feet on the foot pedals. By pushing with the legs and simultaneously pulling the cable, the rider propels the cycle while simulating the workout typically provided by a rowing machine.

It is therefore an object of the present invention to provide a device that eliminates the disadvantages associated with conventional rowing machines.

It is another object of the present invention to provide a cycle that simultaneously exerts the leg, arm and torso muscles.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
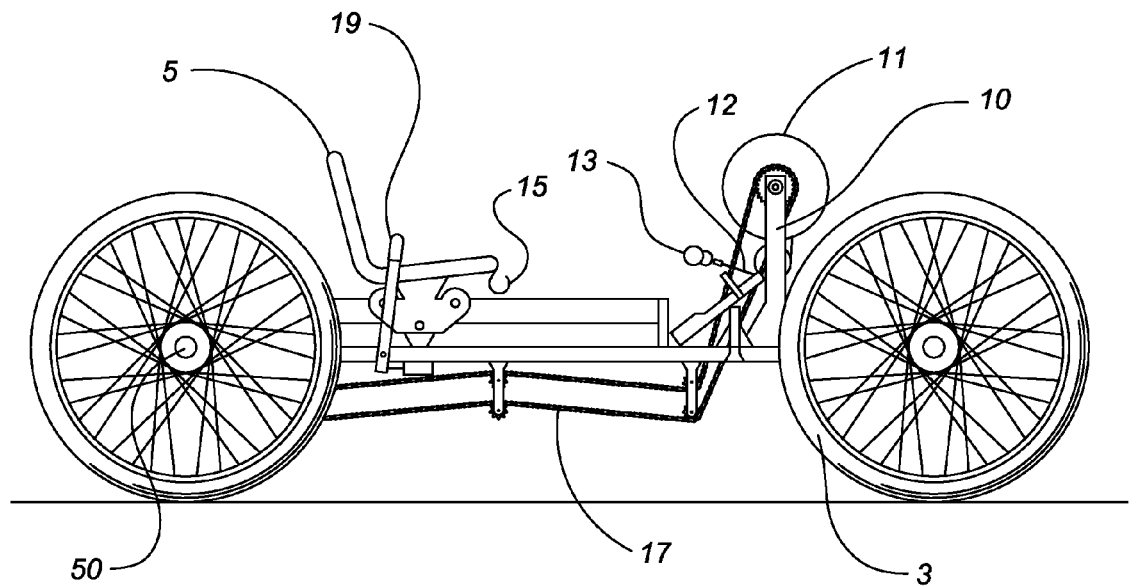
FIG. 1 is a side view of the cycle according to the present invention.
Figure 3:
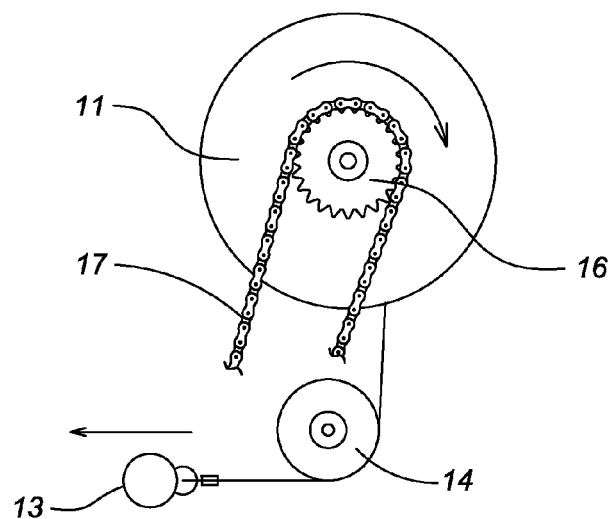
FIG. 3 is a detailed view of the drive pawl and drive chain.
Figure 2:
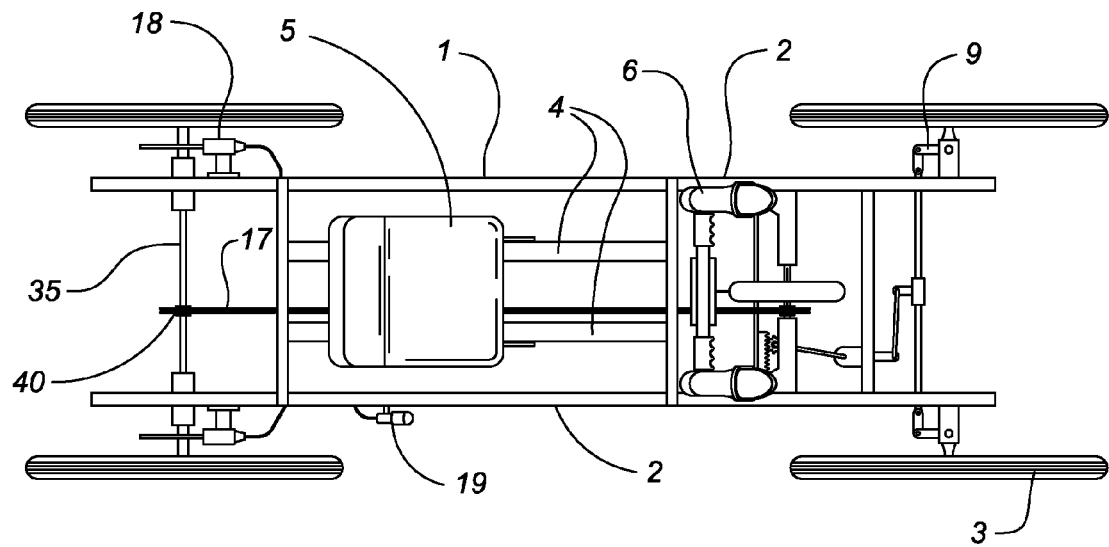
FIG. 2 is an enlarged, top view of the cycle.

The present invention relates to an exercise cycle comprising a base frame 1 formed of a pair of side rails 2 each having a front end and a rear end. A wheel 3 is mounted on both the front end and the rear end of each side rail. Preferably, the wheels are mounted on free-wheeling hubs 50 that ratchet forward with minimal drag when no rotational force is imparted to the axle. Positioned between the rails are a pair of guide tracks 4 with a seat 5 slidably mounted thereon. A pair of foot pedals 6 for accommodating a rider's feet are disposed between the front ends of the guide tracks and the front wheels. The foot pedals are pivotal toward either side rail to operate a steering mechanism for turning the front wheels toward the left or right.

Figure 5:
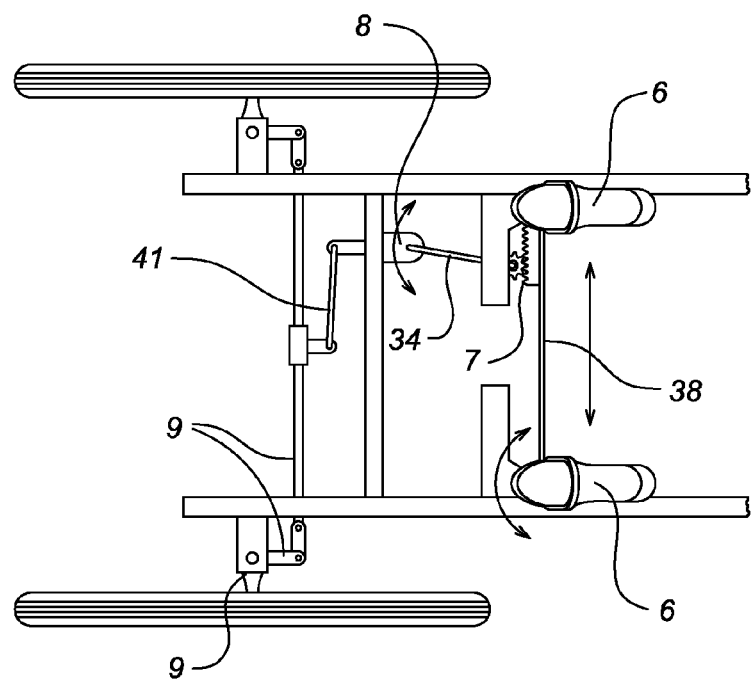
FIG. 5 is a top, detailed view of the steering mechanism.
Figure 4:
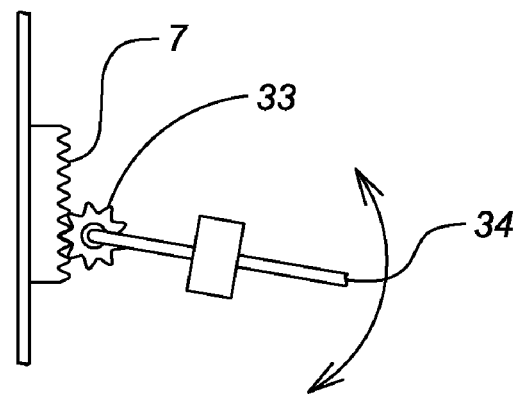
FIG. 4 is an isolated view of the linear gear and spur.

Now referring specifically to FIGS. 4 and 5, the steering mechanism includes a transverse rod 38 extending between the foot pedals that moves laterally as the pedals are pivoted. A linear gear 7 on the rod drives a spur 33 and an associated drive shaft 34 that are operably connected to a conventional garden-tractor-style steering box 8. The steering box, in turn, drives an actuator 41 and an associated tie-rod assembly formed of a plurality of pivotal link members 9 that turn the front wheels in a desired direction in response to linear movement of the actuator. The spur gear converts linear movement of the transverse rod to a rotational motion while the steering box converts the rotational motion back to a linear motion as realized by the actuator.

Between the foot pedals is a vertical support bar 10 having a spring-biased drive pawl 11 at an upper end with a cable 12 wrapped thereabout. The drive pawl 11 spins a flywheel and an associated gear 16 when the cable is extended; a drive chain 17 encompasses the gear 16 and a second similar gear 40 on the rear wheel axle 35 such that rotation of the flywheel propels the cycle. An idler pulley 14 maintains tension on the cable and properly orients a handle 13 attached to the distal end of the cable so that it is easily accessible by a rider resting in the seat. The handle may be secured to a pair of hooks 15 extending from a front edge of the seat should the rider wish to use only the legs to propel the cycle.

Adjacent each rear wheel is a cable-operated disc brake assembly 18 that is actuated with a pivotal handle 19 adjacent the seat. Pulling the handle toward the rear of the base frame applies the brakes thereby slowing or stopping the cycle.

Figure 6:
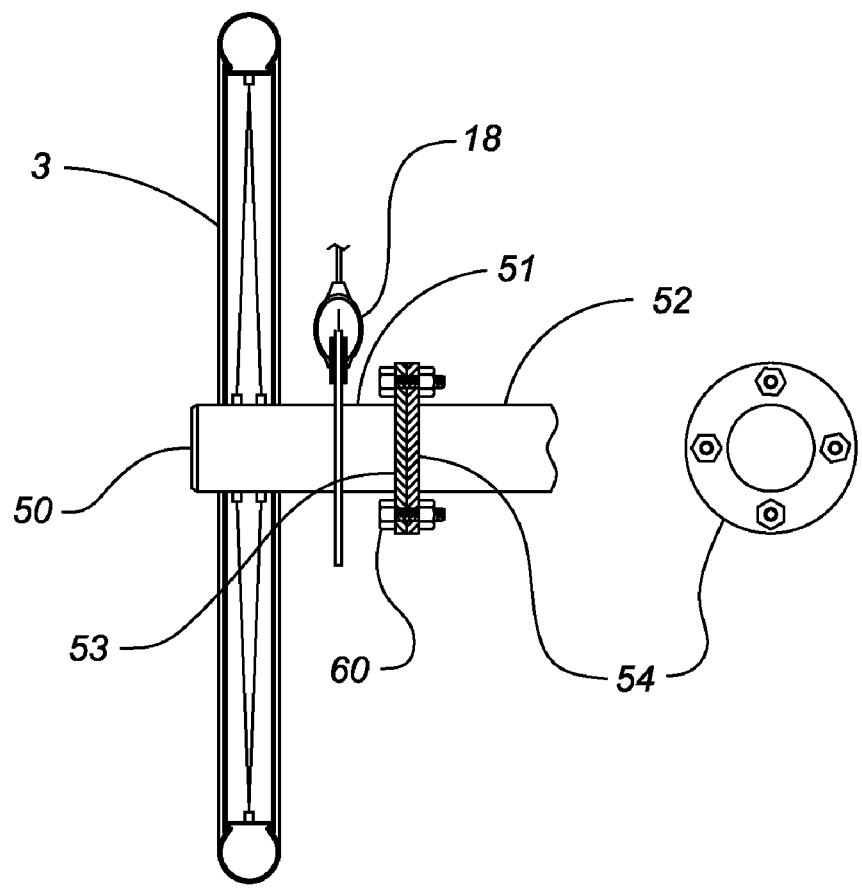
FIG. 6 depicts a rear wheel release mechanism for removing the rear wheel during transport or storage.

Now referring specifically to FIG. 6, the rear wheels are removably secured to the rear axle with a release mechanism that allows the wheels to be removed for transport or storage. The hub 50 is mounted on an outer axle section 51 having a first disc 53 that mates with a second disc 54 on an end of an inner axle section 52. The first and second discs are removably joined with bolts 60 or similar fasteners; therefore, the fasteners are removed and the brake cable is detached allowing each rear wheel to be removed and stored.

Accordingly, a rider sits on the seat, grasps the handle and places the feet on the foot pedals. By pushing with the legs and simultaneously pulling the cable, the rider propels the cycle while simulating the workout typically provided by a rowing machine. To steer the bike along a desired path, the rider simply pivots the foot pedals in the appropriate direction.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An exercise cycle comprising:
   a base frame mounted on a plurality of wheels;
   a seat slidably mounted on said base frame;
   a pair of pivotal foot pedals mounted on said base frame for accommodating a rider's feet;
   a steering means for directing said wheels in a desired direction in response to pivoting said foot pedals;
   a propulsion means for propelling said cycle along an underlying surface in response to a rowing action imparted by a rider seated within said seat, wherein said propulsion means includes a vertical support bar positioned between said foot pedals, said bar having a spring-biased drive pawl mounted thereon, a flywheel operably connected to said drive pawl, a first gear coupled with said flywheel, a cable wrapped about said drive pawl, said cable having a handle at a distal end thereof, a second gear operably connected to one of said wheels, a drive chain encompassing said first gear and said second gear, whereby pulling said handle rotates said pawl, said flywheel and said first and second gears thereby propelling said cycle.

2. The cycle according to claim 1 wherein said cable engages an idler pulley to maintain tension on the cable and to properly position the handle proximal said seat.

3. The cycle according to claim 1 wherein said steering means comprises:
   a rod interconnecting said foot pedals, said rod having at least one linear gear disposed thereon;
   a spur engaging said linear gear, said spur having a drive shaft extending therefrom;
   a steering box connected to said shaft;
   an actuator connected to said steering box;
   a plurality of pivotal link members connected to said actuator, whereby pivoting said foot pedals in a first direction likewise turns the wheels in said first direction.

4. The cycle according to claim 1 further comprising at least one hook attached to said seat for securing said handle thereto allowing a rider to use only legs to propel the cycle.

5. The cycle according to claim 1 further comprising a cable-operated disc brake assembly that is actuated with a pivotal handle adjacent the seat for retarding movement of said cycle.

6. The cycle according to claim 1 wherein said seat is slidably mounted on a pair of guide tracks.

7. An exercise cycle comprising:
   a base frame mounted on a plurality of wheels;
   a seat slidably mounted on said base frame;
   a pair of pivotal foot pedals mounted on said base frame for accommodating a rider's feet;
   a steering means for directing said wheels in a desired direction in response to pivoting said foot pedals wherein said steering means includes a rod interconnecting said foot pedals, said rod having at least one linear gear disposed thereon, a spur engaging said linear gear, said spur having a drive shaft extending therefrom, a steering box connected to said shaft, an actuator connected to said steering box, a plurality of pivotal link members connected to said actuator, whereby pivoting said foot pedals in a first direction likewise turns the wheels in said first direction;
   a propulsion means for propelling said cycle along an underlying surface in response to a rowing action imparted by a rider seated within said seat.

8. The cycle according to claim 7 wherein said propulsion means comprises:
   a vertical support bar positioned between said foot pedals, said bar having a spring-biased drive pawl mounted thereon;
   a flywheel operably connected to said drive pawl;
   a first gear coupled with said flywheel;
   a cable wrapped about said drive pawl, said cable having a handle at a distal end thereof;
   a second gear operably connected to one of said wheels;
   a drive chain encompassing said first gear and said second gear, whereby pulling said handle rotates said pawl, said flywheel and said first and second gears thereby propelling said cycle.

9. The cycle according to claim 8 wherein said cable engages an idler pulley to maintain tension on the cable and to properly position the handle proximal said seat.

10. The cycle according to claim 8 further comprising at least one hook attached to said seat for securing said handle thereto allowing a rider to use only legs to propel the cycle.

11. The cycle according to claim 7 further comprising a cable-operated disc brake assembly that is actuated with a pivotal handle adjacent the seat for retarding movement of said cycle.

12. The cycle according to claim 7 wherein said seat is slidably mounted on a pair of guide tracks.

* * * * *